US010496304B2

(12) United States Patent
Baskaran et al.

(10) Patent No.: US 10,496,304 B2
(45) Date of Patent: Dec. 3, 2019

(54) SYSTEMS AND METHODS FOR MINIMIZING COMMUNICATIONS

(71) Applicant: Reservoir Labs, Inc., New York, NY (US)

(72) Inventors: Muthu M. Baskaran, Old Tappan, NJ (US); Thomas Henretty, Brooklyn, NY (US); Ann Johnson, Saratoga, CA (US); Athanasios Konstantinidis, Brooklyn, NY (US); M. H. Langston, New Windsor, NY (US); Janice O. McMahon, Bethesda, MD (US); Benoit J. Meister, New York, NY (US); Paul D. Mountcastle, Moorestown, NJ (US); Aale Naqvi, New York, NY (US); Benoit Pradelle, Brooklyn, NY (US); Tahina Ramananandro, New York, NY (US); Sanket Tavarageri, New York, NY (US); Richard A. Lethin, New York, NY (US)

(73) Assignee: Reservoir Labs, Inc., New York, NY (US)

( * ) Notice: Subject to any disclaimer, the term of this patent is extended or adjusted under 35 U.S.C. 154(b) by 507 days.

(21) Appl. No.: 14/987,216

(22) Filed: Jan. 4, 2016

(65) Prior Publication Data

US 2016/0196086 A1 Jul. 7, 2016

Related U.S. Application Data

(60) Provisional application No. 62/099,345, filed on Jan. 2, 2015.

(51) Int. Cl.
*G06F 3/06* (2006.01)
*G06F 8/41* (2018.01)

(52) U.S. Cl.
CPC .......... *G06F 3/0631* (2013.01); *G06F 3/0604* (2013.01); *G06F 3/0638* (2013.01);
(Continued)

(58) Field of Classification Search
CPC .... G06F 3/0631; G06F 3/0604; G06F 3/0638; G06F 3/0671; G06F 8/4432; G06F 8/4441; G06F 8/453; Y02D 10/41
See application file for complete search history.

(56) References Cited

U.S. PATENT DOCUMENTS

| 7,100,000 | B1 * | 8/2006 | Ittycheriah | G06F 9/505 379/88.16 |
|---|---|---|---|---|
| 2004/0139222 | A1 * | 7/2004 | Slik | G16H 10/60 709/236 |
| 2018/0074750 | A1 * | 3/2018 | Dudas | G06F 3/0688 |

FOREIGN PATENT DOCUMENTS

WO WO-2010/033622 A3 6/2010

OTHER PUBLICATIONS

Bondhugula, Uday "Compiling Affine Loop Nests for Distributed-Memory Parallel Architectures" (12 pages).
(Continued)

*Primary Examiner* — Reginald G Bragdon
*Assistant Examiner* — Mehdi Namazi
(74) *Attorney, Agent, or Firm* — Goodwin Procter LLP

(57) ABSTRACT

A system for allocation of one or more data structures used in a program across a number of processing units takes into account a memory access pattern of the data structure, and the amount of total memory available for duplication across the several processing units. Using these parameters duplication factors are determined for the one or more data structures such that the cost of remote communication is
(Continued)

minimized when the data structures are duplicated according to the respective duplication factors while allowing parallel execution of the program.

19 Claims, 4 Drawing Sheets

(52) U.S. Cl.
CPC .......... *G06F 3/0671* (2013.01); *G06F 8/4432* (2013.01); *G06F 8/4441* (2013.01); *G06F 8/453* (2013.01); *Y02D 10/41* (2018.01)

(56) References Cited

OTHER PUBLICATIONS

Borkar, Shekhar "Exascale Computing-a fact or a fiction?", IPDPS, May 21, 2013 (49 pages).
Dathathri et al., "Generating Efficient Data Movement Code for Heterogeneous Architectures with Distributed-Memory", Indian Institute of Science, Sep. 11, 2013, (64 pages).
Demmel et al., "Communication-optimal parallel and sequential QR and LU factorizations", Electrical Engineering and Computer Sciences, Aug. 4, 2008 (136 pages).
DiPietro, Robert C., "Extended Factored Space-Time Processing for Airborne Radar Systems", IEEE, 1992 (6 pages).
Feautrier, Paul Some efficient solutions to the affine scheduling problem Part I One-dimensional Time, Jun. 27, 1996 (42 pages).
Iriqoin et al., "Supernode Partitioning" (11 pages).
Kogge et al., "ExaScale Computing Study: Technology Challenges in Achieving Exascale Systems", Sep. 28, 2008 (297 pages).
Meister et al., "The R-Stream Compiler" (17 pages).
Nieplocha et al., "Advances, Applications and Performance of the Global Arrays Shared Memory Programming Toolkit", Computational Sciences and Mathematics Department (46 pages).
Shalf et al., "Exascale Computing Technology Challenges", Springer-Verlag Berlin Heidelberg, 2011 (25 pages).
Solomonik, et al., "Communication-optimal parallel 2.5D matrix multiplication and LU Factorization algorithms", University of California (26 pages).
"Test, Assessment and Verification Effort (TAV) for the DARPA Perfect Program", Pacific Northwest National Laboratory (2 pages).
Vasilache et al., "Trading off memory for parallelism quality", Impact 2012 (9 pages).
Xue, Jinglng "On Tiling as a Loop Transformation", Department of Mathematics, Statistics and Computing Science, (15 pages).
Amarasinghe, Saman P., "Communication Optimization and Code Generation for Distributed Memory Machines", Jun. 1993 (14 pages).
Demmell et al., "Communication avoiding rank revealing QR Factorization with column pivoting" (41 pages).

\* cited by examiner

```
int i;
for ( i = 0; i < N; i++) {
   A[ i ] = B[ i ] + 1;
}
```

FIG. 1

```
int PROC = r_nodeid ( );
float A_1 [N/4];
float B_1 [N/4];
r_dma_get ( B_id , (N/4) * PROC, B_1 , 1 , 1 , N/4);
int i;
for ( i = 0; i < N/4 ; i++) {
    A-1[ i ] = B_1[ i ] + 1;
} r_dma_put ( A_1 , A_id , (N/4) * PROC, 1 , 1 , N/4);
```

FIG. 2

# SYSTEMS AND METHODS FOR MINIMIZING COMMUNICATIONS

CROSS-REFERENCE TO RELATED APPLICATIONS

This application claims benefit of priority to U.S. Provisional Patent Application Ser. No. 62/099,345 entitled "Systems and Methods for Software Optimization," filed on Jan. 2, 2015, the contents of which are incorporated herein by reference in their entirety.

FIELD OF THE INVENTION

This disclosure generally relates to systems and methods for optimization of computing systems and, in particular, for optimizations that can reduce the number and/or cost of data communication among processing and/or memory modules.

BACKGROUND

The increasing complexity and heterogeneity of supercomputers as we move beyond petaflop systems has called for an urgent development of programming and runtime systems that automatically deal with the complexity and at the same time run computations in a way that is efficient both from performance and energy considerations. The main challenges to address in the context of parallel computers, inter alia, are: effective parallelization and communication management between parallel processors. As the cost of communication has increased significantly relative to the cost of computation, it has become crucial that new techniques be developed that minimize communication in parallel computations.

To this end, there has been a significant amount of research in the realm of automatic cluster parallelization. Compiler algorithms using the polyhedral model for generation of required communication—receive and send instructions for a given computation and data distribution have been described. Techniques to reduce inefficiencies in communication generation schemes of earlier works have also been proposed.

Communication minimization in general has also received a lot of attention from the research community. The communication avoiding algorithms for various numerical algebra problems—such as matrix multiplication, LU decomposition have been developed and operate in 2.5D processor grids (they are 3 dimensional grids and one of the dimensions is of a constant size, hence the name 2.5D). These techniques generally trade off higher memory use (via data replication) for communication. The algorithms replicate either read-only data or reduction arrays and are applicable only for certain processor grid configurations, namely 2.5D.

Some source-to-source compilers, such as R-Stream™, can perform for automatic parallelization of sequential programs. The R-Stream™, for example, accepts loop nests such as those written in C or another programming language and produces parallelized codes for different targets, including multi-core machines, GPUs, and FPGAs. R-Stream™ can perform cluster parallelization. The R-Stream™ compiler uses the polyhedral model for program analysis and transformation. It implements high performance techniques that enhance data locality and perform parallelization.

The generated cluster-parallel programs have the SPMD (Single Program Multiple Data) form. R-Stream™, for example, can aggregate loop iterations into tasks as part of its parallelization process. The aggregation process may use the tiling program transformation. Data communication between processors are typically performed at the boundaries of these tasks. Communication operations are abstracted as logical DMA (Direct Memory Access) primitives—each task issues logical DMA GETs to fetch data needed for computation and PUTs to store live-out data produced by the task. The logical DMA operations are in turn implemented as an R-Stream™ runtime layer functionality using the Global Arrays™ toolkit. Global Arrays (GAs) may provide a global address space for creating and accessing data structures such as one and/or multi-dimensional arrays. Some techniques, such as those described in co-pending U.S. patent application Ser. No. 14/181,201, entitled, "Methods and Apparatus for Data Transfer Optimization," describe efficient use of bulk transfer operations such as DMA commands. Some techniques, such as those described in co-pending U.S. patent application Ser. No. 13/712,659, entitled "Methods and Apparatus for Automatic Communication Optimizations in a Compiler Based on a Polyhedral Representation," describe minimization of communication cost by replacing data exchanges between local and global memories with exchanges between two or more local memories.

SUMMARY

In various embodiments, methods and systems described herein feature techniques that can enhance parallel computing by adapting to constraints imposed by system resource availability, such as memory size. In particular, we present a communication minimizing scheme that can trades off communication and the use of available memory in a flexible fashion. In general, this technique stores redundant copies of selected data structures on the distributed memory of the system so that accesses to them can be serviced locally, thus reducing inter-node communication. The requests for data may be routed to the nearest processor and coherence among multiple copies of data can be automatically managed.

This communication-minimizing approach is general in that it is not specific to any particular algorithm or program to be executed using a multi-node computing system. In various embodiments, the enhanced auto-parallelization technique can separate the concern of finding parallelism in the computation to that of movement of data in the parallel computer. In particular, the compiler may parallelize code and may insert virtual memory instructions that specify data that will be consumed and produced by the parallel tasks. The runtime may initiate and orchestrate communication by being cognizant of the underlying message passing mechanism. Compiler-generated inspectors can guide the runtime system in making decisions with regard to how much additional memory to use and what to store in that additional memory. Thus, various embodiments feature one or more of: (1) an integrated compiler and runtime system for cluster auto-parallelization that decouples the concerns of computation-placement and data-placement and thus facilitates dealing with the system complexity effectively; (2) an algorithm-agnostic approach to communication minimization by selectively replicating data; and (3) an analytical investigation of the relation between program characteristics, e.g., the number of reads and writes, to the best data replication arrangement. An experimental evaluation of the effectiveness of the communication minimizing scheme is also provided.

Accordingly, in one aspect, a method is provided for allocating data structures to a number of processing nodes, where each processing node has a respective local memory. The method includes performing by a processor the steps of: (a1) selecting as a first data structure, a data structure having a read-write ratio greater than a read-write threshold, (b1) computing a first duplication factor for the first data structure, and (c1) generating a first statement allocating the first data structure duplicated by the first duplication factor, across the several processing nodes.

The first duplication factor may be based on, at least in part, one or more of: (i) a number of the plurality of processing nodes, (ii) the read-write ratio of the first data structure, (iii) a first value of total available memory size of the plurality of processing nodes, and (iv) a size of the first data structure. The method may further include computing by the processor the first value of the total available memory size using a sum of memory capacity of each processing node. The method may also include computing by the processor another value of the total available memory size based on, at least in part, the first value, the first duplication factor, and the size of the first data structure.

In some embodiments, the method includes performing by the processor the steps of: (a2) selecting as a second data structure, another data structure having a read-write ratio greater than the read-write threshold, and (b2) computing a second duplication factor for the second data structure, where the second duplication factor is based on, at least in part, one or more of: (i) the number of the plurality of processing nodes, (ii) the read-write ratio of the second data structure, (iii) a second value of total available memory size of the plurality of processing nodes, and (iv) a size of the second data structure. The method may also include: (c2) generating a second statement allocating the second data structure duplicated by the second duplication factor, across the several processing nodes.

In some embodiments, the method further includes performing by the processor the step of, prior to performing the steps (b1) and (b2), comparing the read-write ratio of the first data structure with the read-write ratio of the second data structure. The method may also include, if the read-write ratio of the first data structure is greater than the read-write ratio of the second data structure, performing the step (b1) before the step (b2), and computing the second value of the total available memory size based on, at least in part, both the first duplication factor and the size of the first data structure. The method may include, if the condition described above is not true, performing the step (b2) before the step (b1).

In some embodiments, the method includes computing by the processor the read-write ratio of the first data structure. The read-write threshold may be computed as a function of the number of different processing nodes. Alternatively or in addition, the method may include computing a correction factor representing an average local access to the first data structure by one or more processing nodes, and computing the read-write threshold as a function of the number of processing nodes and the correction factor.

In some embodiments, the method further includes performing by the processor the step of: generating a local write statement for the first data structure. A first processing node may store a data value in an instance of the first data structure in local memory of the first processing node using the local write statement. The method may also include, for one or more additional processing nodes, generating a set of remote write statements for the first data structure, allowing the first processing node to store the data value in respective instances of the first data structure in respective local memories of the one or more nodes. The number of the additional processing nodes and/or the cardinality of the set of write statements may depend on the first duplication factor.

In another aspect, a system is provided for allocating data structures to a number of processing nodes, where each processing node has a respective local memory. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both.

The instructions in the first memory program the processing unit to: (a1) select as a first data structure, a data structure having a read-write ratio greater than a read-write threshold, (b1) compute a first duplication factor for the first data structure, and (c1) generate a first statement allocating the first data structure duplicated by the first duplication factor, across the several processing nodes. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to allocate data structures to a number of processing nodes, where each processing node has a respective local memory. The instructions may program the processing unit to (a1) select as a first data structure, a data structure having a read-write ratio greater than a read-write threshold, (b1) compute a first duplication factor for the first data structure, and (c1) generate a first statement allocating the first data structure duplicated by the first duplication factor, across the several processing nodes. In various embodiments, the instructions can program the processing unit to perform one or more of the method steps described above.

In another aspect, a method is provided for allocating data structures to several processing nodes, where each processing node has a respective local memory. The method includes performing by a processor the steps of: (a) selecting a set of data structures, where each data structure has a read-write ratio greater than a read-write threshold, and (b) designating a rank to each data structure according the read-write ratio thereof and ordering the set of data structures according to the ranks. The method also includes (c) iterating in the order of the ordered set, where each iteration includes: (i) computing for a data structure corresponding to the iteration a duplication factor, and (ii) generating a statement allocating the data structure duplicated by the duplication factor across the several processing nodes.

In some embodiments, the duplication factor is based on, at least in part, a value of total available memory size of the several processing nodes. The method may further include, during a current iteration of the step (c) and prior to a next iteration, updating by the processor, the value of the total available memory size based on, at least in part, the size of the data structure corresponding to the current iteration and the duplication factor associated with the data structure. In some embodiments, the method includes computing by the processor, during a first iteration of the step (c), the value of the total available memory size using a sum of memory capacity of each processing node. In each iteration of the step (c), the duplication factor may be based on, at least in part, at least one of: (i) a number of the plurality of processing nodes, (ii) the read-write ratio of the data structure corresponding to the iteration, (iii) a size of the data structure, and (iv) a value of total available memory size of the plurality of processing nodes.

In another aspect, a system is provided for allocating data structures to several processing nodes, where each processing node has a respective local memory. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory program the processing unit to: (a) select a set of data structures, where each data structure has a read-write ratio greater than a read-write threshold, and (b) designate a rank to each data structure according the read-write ratio thereof and to order the set of data structures according to the ranks.

The instructions further program the processing unit to: (c) iterate in the order of the ordered set, where in each iteration, the processing unit is programmed to: (i) compute for a data structure corresponding to the iteration a duplication factor, and (ii) generate a statement allocating the data structure duplicated by the duplication factor across the several processing nodes. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to allocate data structures to several processing nodes, where each processing node has a respective local memory. The instructions may program the processing unit to: (a) select a set of data structures, where each data structure has a read-write ratio greater than a read-write threshold, and (b) designate a rank to each data structure according the read-write ratio thereof and to order the set of data structures according to the ranks.

The instructions may further program the processing unit to: (c) iterate in the order of the ordered set, where in each iteration, the processing unit is programmed to: (i) compute for a data structure corresponding to the iteration a duplication factor, and (ii) generate a statement allocating the data structure duplicated by the duplication factor across the several processing nodes. In various embodiments, the instructions can program the processing unit to perform one or more of the method steps described above.

In another aspect, a method is provided for allocating data structures to a number of processing nodes, where each processing node has a respective local memory. The method includes performing by a processor the steps of: (a) selecting a set of data structures, where each data structure has a read-write ratio greater than a read-write threshold, and (b) computing a respective value of a memory access parameter for each data structure. The method also includes (c) determining a respective duplication factor for each data structure by optimizing a function of the respective duplication factors and the respective values of the memory access parameter. The optimization may be performed subject to a memory capacity constraint based on a number N of processing nodes, N being greater than one. The duplication factor for each data structure may be greater than or equal to one.

The memory access parameter may include a reduction in the number of remote accesses, and optimizing the function may include maximizing the function. In some embodiments, the memory access parameter includes the number of remote accesses, and optimizing the function may include minimizing the function. A first respective value of the memory access parameter corresponding to a first data structure may include a first correction factor based on an association between the first data structure and a first processing node. Optimizing the function may include solving a mixed integer linear programming representation or an integer linear programming representation of the function and the memory capacity constraint.

In another aspect, a system is provided for allocating data structures to a number of processing nodes, where each processing node has a respective local memory. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory program the processing unit to: (a) select a set of data structures, where each data structure has a read-write ratio greater than a read-write threshold, and (b) compute a respective value of a memory access parameter for each data structure.

The instructions also program the processing unit to: (c) determine a respective duplication factor for each data structure by optimizing a function of the respective duplication factors and the respective values of the memory access parameter. The optimization may be performed subject to a memory capacity constraint based on a number N of processing nodes, N being greater than one. The duplication factor for each data structure may be greater than or equal to one. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to allocate data structures to a number of processing nodes, where each processing node has a respective local memory. The instructions may program the processing unit to: (a) select a set of data structures, where each data structure has a read-write ratio greater than a read-write threshold, and (b) compute a respective value of a memory access parameter for each data structure.

The instructions may also program the processing unit to: (c) determine a respective duplication factor for each data structure by optimizing a function of the respective duplication factors and the respective values of the memory access parameter. The optimization may be performed subject to a memory capacity constraint based on a number N of processing nodes, N being greater than one. The duplication factor for each data structure may be greater than or equal to one. In various embodiments, the instructions can program the processing unit to perform one or more of the method steps described above.

BRIEF DESCRIPTION OF THE DRAWINGS

In the following description, various embodiments of the present invention are described with reference to the following drawings, in which:

FIG. 1 depicts an example program that uses a data structure and that can be parallelized;

FIG. 2 depicts a parallel implementation using four processing units, of the example program shown in FIG. 1;

DETAILED DESCRIPTION

Figure 3:
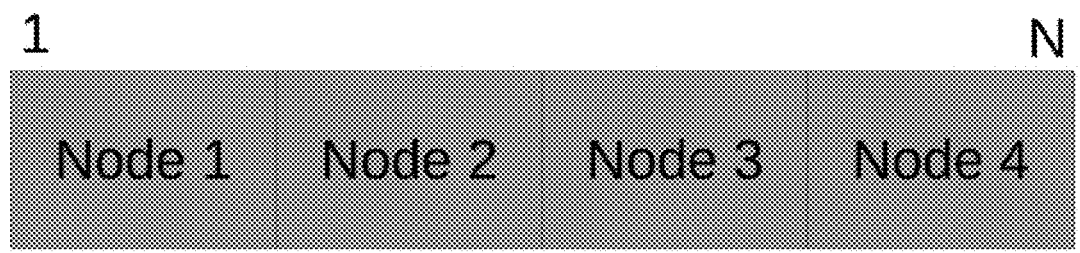
FIG. 3 schematically depicts a distribution of the data structure of the parallel implementation of the example program, as shown in FIG. 2, across four processing units.

Various embodiments described herein employ a different approach to communication generation. Communication responsibility is split between the compiler and the runtime. The compiler identifies data that the computation consumes and produces. The runtime handles the job of placement of data and communication between processors. This technique, unlike compiler-only methods, does not bake communication into generated code, instead affords flexibility to dynamically place and communicate data in a resource-aware manner. The decision to replicate data to a varying degree based on memory availability of the prevailing execution environment, as described herein, cannot be easily accomplished in a fully compiler-generated communication scheme.

We illustrate cluster-parallelization in R-Stream™ using an example. Consider the loop shown in FIG. 1. It adds a constant—1 to N elements of array B and stores the result in array A. The R-Stream™ compiler, for this input and a 4-node cluster, produces parallelized code shown in FIG. 2. The computation is partitioned such that each processor increments $$\frac{N}{4}$$

elements of array B. A DMA GET instruction is issued for the data required by the task and the data written in the loop are stored using a DMA PUT operation at the end.

The DMA formation phase in R-Stream™ can emit efficient logical DMA operations: whenever the data to be read and written have contiguous portions in them, data movement can be orchestrated in such a way that there will be a single DMA call for a contiguous segment of data. The co-pending U.S. patent application Ser. No. 14/181,201, the entire disclosure of which is incorporated herein by reference, describes techniques for the generation and optimization of bulk data transfer commands such as DMA GET and PUT. The co-pending U.S. patent application Ser. No. 13/712,659, the entire disclosure of which is also incorporated herein by reference, describes techniques for distributing data structures in a distributed memory system such that relatively costly data exchanges between a local memory and a main memory can be replaced with data exchanges among local memories. In various embodiments, the duplication technique described herein is different from these techniques in that this technique can minimize the number of times a bulk-transfer command and/or data exchanges among local memories.

We note that the R-Stream™ compiler can generate two-level parallelized code—one for inter-node execution and one for intra-node (OpenMP™ being one of the several programming models and runtimes available for intra-node parallelization). Cluster parallelization and communication minimization between nodes are the focus of various embodiments described herein and, as such, the examples presented show one-level (inter-node) parallelized code for the sake of simplicity. The subsequent discussion and experimental evaluation are also focused on cluster-centric techniques.

Communication Minimization via Data Replication

Global arrays may reside in a Partitioned Global Address Space (PGAS) of a cluster. They are distributed among the memories of participating nodes. One advantage of global arrays is that the parallel program can be highly scalable with respect to memory usage—the parallel program can handle problem sizes whose data structures can be allocated on the collective memory space of the system.

When additional memory beyond the minimal amount required to allocate all arrays used by a computation is available, we use the excess memory capacity at our disposal to reduce communication between nodes. The discussion generally refers to arrays for the sake of simplicity. The techniques described herein are generally applicable to any data structure.

FIG. 3 shows the distribution of a global array of size N among four nodes. A quarter of the array is resident on each node. Replicating an array has the following advantages: (1) It can increase the fraction of the global array stored on any one node, thereby increasing the number of DMA GETs serviced locally. Consequently, non-local (remote) memory accesses may be proportionately reduced and communication between nodes can be minimized for DMA GETs. (2) When a requested array cell through DMA GET is not locally available, the desired array element can be retrieved from a copy that is closer to the requested node, hence reducing latency of the message. Steering request for a data element to different servers can also help distribute communication traffic on the system and reduces the possibility of performance hot-spots.

Figure 4:
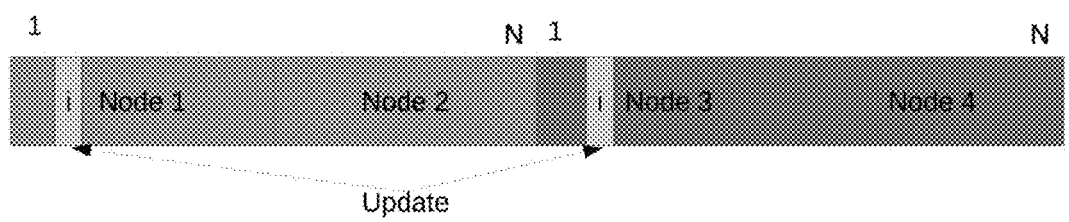
FIG. 4 schematically depicts a distribution with duplication, of the data structure of the parallel implementation of the example program, as shown in FIG. 2, across four processing units, and read access to the data structure, according to one embodiment.

FIG. 4 shows a duplicated global array. Nodes 1 and 2 hold one full copy of the array; nodes 3 and 4 hold another full copy. Each node is now home to half of the array (as opposed to a quarter earlier) and DMA GET requests to half of the array are serviced from the local memory. When an array cell is not available in local memory, the DMA GET request is directed to the closest node that holds the data. The closest node can be described in terms of MPI ranks. The determination of the closest node can be modified to incorporate network topology information. FIG. 4 shows that an array element i can be obtained either from node 1 or node 3.

Figure 5:
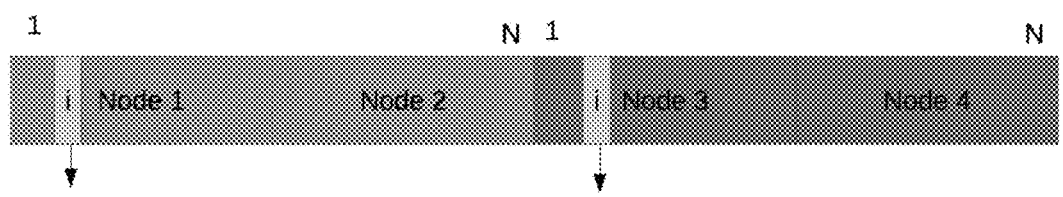
FIG. 5 schematically depicts the distribution with duplication across four processing units, as shown in FIG. 4, and write access to the data structure, according to one embodiment.

To maintain coherence among different copies of data, when a DMA PUT is issued for an array cell, the write is propagated to all copies. FIG. 5 depicts the scenario when array element at index i is written. The updated value is sent to both the locations that are replicas of cell i.

Replication of data can thus decrease remote memory accesses for DMA GETs, but may increase remote memory accesses for DMA PUTs. Therefore, a replication scheme is generally beneficial when DMA GET data volume is larger than that of DMA PUTs. Equivalently, the overall communication can be reduced when the number of reads is greater than the number of writes. We analyzed the interplay between the read-to-write ratio and data movement on the cluster as described below.

We note that the number of reads being higher than the number of writes in programs is a common case. Hence, the communication minimization method developed here is expected to be widely applicable.

Data Replication Considerations

The communication minimizing configuration—which arrays to replicate and by how much—generally depends on the amount of communication generated by DMA GETs and PUTs in the computation. In some embodiments, the compiler inserts inspector codes which inform the runtime system of the read and write characteristics of the program, and the runtime can then accordingly make decisions on data replication.

Compiler Generated Inspector Codes

In some embodiments, a compiler such as R-Stream™ can insert inspectors before the actual computation code that call dummy virtual DMA functions. The runtime, on a per-array basis, can keep count of the total number of elements read through GETs and written through PUTs on each node. It then accumulates counts on all nodes and calculates the grand total of reads—$\mathcal{R}$ and, writes—$\mathcal{W}$ on a per-array basis.

Best Data Replication Factor

We would like to derive data replication factor $\alpha$ that reduces data movement between nodes. We first reason about the expected number of remote memory accesses without data replication and then the number of array elements communicated between nodes after the array is replicated $\alpha$ times. If the array size originally is N, after data replication its size becomes $\alpha$N and the array is distributed in equal chunks on all nodes in either case. Data replication factors may be determined for different arrays separately.

Let the number of nodes in the system be $\mathcal{N}$ and the number of array elements read by node i through DMA GETs be $r_i$ and written via DMA PUT be $w_i$. Therefore, the total number of reads $\mathcal{R}$ by all nodes is: $\mathcal{R} = \sum_{i=1}^{\mathcal{N}} r_i$. Similarly, the total number of writes $\mathcal{W}$ is: $\mathcal{W} = \sum_{i=1}^{\mathcal{N}} w_i$.

Before data replication: The probability that a requested array cell is mapped locally is proportional to $$\frac{1}{\mathcal{N}}$$

and in fact it is $$\frac{1}{\mathcal{N}}$$

if the accesses to the array are uniformly random. However, when the compiler has performed optimized computation placement, we can expect the data references to not be fully random, and the array access behavior may favor local portions of the array. To model data access characteristics of real applications, we introduce a correction factor $\beta$ such that the fraction of local accesses is $$\frac{\beta}{\mathcal{N}}.$$

We note that when $\beta=1$, the probability defaults to uniformly random accesses and when $\beta>1$, it characterizes an optimized computation placement. Hence, the expected number of reads to local memory on node i is:

$$\frac{\beta r_i}{\mathcal{N}}.$$

The total number of reads to local memory on the system thus is:

$$\left(\sum_{i=1}^{\mathcal{N}} \frac{\beta r_i}{\mathcal{N}}\right) = \frac{\beta \mathcal{R}}{\mathcal{N}}.$$

The cumulative number of writes to local memory in a like fashion is $$\frac{\beta \mathcal{W}}{\mathcal{N}}.$$

Consequently, the number of local memory accesses (reads and writes combined) is:

$$\frac{\beta(\mathcal{R}+\mathcal{W})}{\mathcal{N}}.$$

The number of remote memory accesses is:

$$(\mathcal{R}+\mathcal{W}) - \frac{\beta(\mathcal{R}+\mathcal{W})}{\mathcal{N}} = \frac{(\mathcal{R}+\mathcal{W})(\mathcal{N}+\beta)}{\mathcal{N}}.$$

After data replication: When an array is replicated $\alpha$ number of times, $$\frac{\alpha}{\mathcal{N}}$$

fraction of the array is assigned to any given node. Therefore, the probability that a requested array cell can be found on the same node is proportional to $$\frac{\alpha}{\mathcal{N}}$$

and using the correction factor $\beta$, it is $$\frac{\alpha\beta}{\mathcal{N}}.$$

Consequently, the expected number of local reads across the system is $$\frac{\alpha\beta\mathcal{R}}{\mathcal{N}}.$$

The expected number of remote reads is:

$$\mathcal{R} - \frac{\alpha\beta\mathcal{R}}{\mathcal{N}} = \frac{\mathcal{R}(\mathcal{N} - \alpha\beta)}{\mathcal{N}}.$$

When a write to an array cell is performed by node i, in some embodiments, the write will be broadcast to $\alpha$ copies of the array. Hence the number of writes made by i will be $\alpha w_i$. Let us consider a single application-level write which translates to $\alpha$ runtime-level writes to $\alpha$ different replicas of the array. Of the $\alpha$ writes, at most one write can be local, the others will be remote: more than one copy of any array cell will not be mapped to the same node. The probability that the one write will be local is $$\frac{\alpha\beta}{\mathcal{N}}.$$

Therefore, the expected number of local writes is:

$$\frac{\alpha\beta}{\mathcal{N}} w_i.$$

The total number of local writes is $$\sum_{i=1}^{\mathcal{N}} \frac{\alpha\beta}{\mathcal{N}} w_i.$$

The total number of remote writes is:

$$\alpha\mathcal{W} - \frac{\alpha\beta}{\mathcal{N}}\mathcal{W} = \frac{\alpha\mathcal{W}(\mathcal{N} - \beta)}{\mathcal{N}}.$$

The number of remote reads and writes together will be:

$$\frac{\mathcal{R}(\mathcal{N} - \alpha\beta)}{\mathcal{N}} + \frac{\alpha\mathcal{W}(\mathcal{N} - \beta)}{\mathcal{N}}.$$

Data replication condition: We want to minimize the number of remote memory accesses. It is observed that after data replication, the number of remote reads is decreased while the number of remote writes is increased. And, we would like the total number of remote memory accesses—reads and writes combined after data replication to be less than that before data replication.

If $\mathcal{W}$ is 0, that is when an array is read-only, data replication always reduces communication. When $\mathcal{W} > 0$, for remote memory accesses after data replication to be less than before data replication, we must generally have:

$$\frac{\mathcal{R}(\mathcal{N} - \alpha\beta)}{\mathcal{N}} + \frac{\alpha\mathcal{W}(\mathcal{N} - \beta)}{\mathcal{N}} < \frac{(\mathcal{R} + \mathcal{W})(\mathcal{N} - \beta)}{\mathcal{N}} \quad (1)$$

$$\mathcal{R}(\mathcal{N} - \alpha\beta) + \alpha\mathcal{W}(\mathcal{N} - \beta) < (\mathcal{R} + \mathcal{W})(\mathcal{N} - \beta)$$

$$\alpha\mathcal{W}(\mathcal{N} - \beta) - \mathcal{W}(\mathcal{N} - \beta) < \mathcal{R}(\mathcal{N} - \beta) - \mathcal{R}(\mathcal{N} - \alpha\beta)$$

$$\frac{\alpha(\mathcal{N} - \beta) - (\mathcal{N} - \beta)}{(\mathcal{N} - \beta) - (\mathcal{N} - \alpha\beta)} < \frac{\mathcal{R}}{\mathcal{W}}$$

$$\frac{(\alpha - 1)\mathcal{N} - (\alpha\beta - \beta)}{\alpha\beta - \beta} < \frac{\mathcal{R}}{\mathcal{W}}$$

$$\Rightarrow \frac{\mathcal{N}}{\beta} - 1 < \frac{\mathcal{R}}{\mathcal{W}}$$

Inequality (1) indicates that if the read-to-write ratio is greater than $$\frac{\mathcal{N}}{\beta} - 1,$$

data replication will probabilistically reduce communication. We observe that when the probability of a data reference accessing any part of the global array is the same (i.e., when $\beta=1$), the required read-to-write ratio is $\mathcal{N} - 1$. As the probability changes to favor more of locally mapped portions of the global array ($\beta > 1$), the minimum read-to-write ratio decreases to a smaller value.

Remote memory accesses: The number of remote memory accesses reduced—difference between the number of remote accesses before and after data replication is as follows.

$$\left(\frac{(\mathcal{R} + \mathcal{W})(\mathcal{N} - \beta)}{\mathcal{N}}\right) - \left(\frac{\mathcal{R}(\mathcal{N} - \alpha\beta)}{\mathcal{N}} + \frac{\alpha\mathcal{W}(\mathcal{N} - \beta)}{\mathcal{N}}\right) = \quad (2)$$

$$\left(\frac{\mathcal{R}(\mathcal{N} - \beta)}{\mathcal{N}} - \frac{\mathcal{R}(\mathcal{N} - \alpha\beta)}{\mathcal{N}}\right) - \left(\frac{\alpha\mathcal{W}(\mathcal{N} - \beta)}{\mathcal{N}} - \frac{\mathcal{W}(\mathcal{N} - \beta)}{\mathcal{N}}\right) =$$

$$\frac{(\alpha - 1)\beta\mathcal{R}}{\mathcal{N}} - \frac{(\alpha - 1)\mathcal{W}(\mathcal{N} - \beta)}{\mathcal{N}} = (\alpha - 1)\left(\frac{\beta(\mathcal{R} + \mathcal{W})}{\mathcal{N}} - \mathcal{W}\right)$$

Expression (2) represents reduction in remote memory accesses. We note that for all values of $\beta$, as the data replication factor a increases, reduction in remote memory accesses also increases. Equivalently, remote memory accesses are reduced.

Overall Procedure for Data Replication

Given array sizes, read-to-write ratios, and the memory capacity of the system, there can be several ways of replicating arrays that efficiently use up the available memory. But, we would want to find an optimal data replication regimen—assignment of values to as, that results in minimized remote memory accesses.

An ILP Formulation: We want to maximize the decrease in remote memory accesses, subject to the constraints that the memory capacity is not exceeded on each node, while at least one copy of each array is maintained in the system. Given k arrays with array sizes $s_j$ and per-node memory capacity $C$, we formulate the problem of finding optimal per-array replication factors $\alpha_j s$ as an Integer Linear Programming (ILP) or Mixed ILP (MILP) problem. Expression (2) gives the reduction in remote accesses for a single array and we want to maximize the sum of remote memory reductions across all arrays.

$$\text{maximize} \left\{ \sum_{j=1}^{k} (\alpha_j - 1) \left( \frac{\beta_j(\mathcal{R}_j \mid \mathcal{W}_j)}{\mathcal{N}} - \mathcal{W}_j \right) \right\}$$

$$\text{subject to: } \left( \sum_{j=1}^{k} \alpha_j s_j \right) \leq C\mathcal{N}, \text{ and } \alpha_j >= 1$$

In some embodiments the sum of remote accesses across all arrays is minimized.

Heuristic: Even though the ILP formulation would give an optimal solution to the problem of replication assignment, solving the ILP problem can be expensive at runtime. Therefore, we propose a heuristic based on the premise that given a choice to replicate either array A or array B, it would be more beneficial to replicate the array with a higher read-to-write ratio.

Algorithm 1 presents such a data replication strategy according to some embodiments. The replication decisions can be made starting with the array that has the highest read-to-write ratio: the higher the number of reads relative to the number writes, greater is the potential in general to reduce communications via replication. We can replicate an array meaningfully only up to the total number of nodes: we can at most have one copy of the array at each node in various embodiments.

---

Algorithm 1 Replication Factor Determination
Input:  Inputs are:
    1) Number of nodes: $\mathcal{N}$
    2) Array of array identifier, array size and its read-to-write
       ratio: $\left\{ \varphi_i, s_i, \frac{\mathcal{R}}{\mathcal{W}_i} \right\}$
    3) Memory size of the distributed memory system: $\mathcal{M}$
    4) Read-to-write threshold: $\varphi$
Output: Array of array identifiers and their replication factors $\{\varphi_i, \alpha_i\}$
Initialize all $\alpha_i$s to 1 and $\mathcal{U}$ to total size of all arrays
Sort arrays in decreasing order of their read-to-write ratios
Memory used: $\mathcal{U} \leftarrow 0$
for all Array $\varphi_i$ do
    if $\frac{\mathcal{R}}{\mathcal{W}_j} > \phi$ then Max of copies of array possible: $\alpha_{max} \leftarrow \frac{\mathcal{M} - \mathcal{U}}{s_j}$ $\alpha_j \leftarrow 1 + \min\left(\mathcal{N} - 1, \frac{\mathcal{R}}{\mathcal{W}_j} - 1, \alpha_{max}\right)$ $\mathcal{U} \leftarrow \mathcal{U} + (\alpha_j - 1)s_j$
    end if
end for

---

Data Structure Placement to Improve Correction Factor β

In some embodiments, a compiler can derive communication-minimizing schedule for the input code, parallelizes it, and may also perform computation placement, i.e., allocation of different parallel computations to different processing units (processors, cores, etc.). The compiler may then determine a data distribution (i.e., perform data placement) for one or more data structures in the input code for the generated computation placement so that the resulting data movement is minimized. For example, in some embodiments, the total volume of communication may be minimized. To this end, the following procedure is employed in some embodiments.

Data Tiling. We first perform data tiling and want to find the best "home-node" for a given data tile. Running this procedure at the granularity of a data-tile is more scalable in terms of resulting storage requirements for the data-tile to processor map, but the mapping can be invoked at an individual data element level also.

A Compiler Algorithm to Derive Data-Tile Placement Functions. We want to map a given data tile to the processor that most uses it: To this end, for a given data tile, iterations that access that data tile are computed. Then, the number of those iterations that are mapped to each processor are counted. The processor that receives most iterations using a given data tile may become the home-node for the data tile. To compute data-tile to processor mapping for all data-tiles, the product space of data-tiles and processors may be traversed. We note that such a traversal code is completely parallel and hence, can be distributed among processors.

Runtime Support for Data-Tile Placements. The above exercise generally results in a mapping that is unconstrained and therefore, can be beneficial from the point of view of communication-avoidance. For example, if we have four data-tiles—$D_1$, $D_2$, $D_3$, $D_4$ and two processors—$P_1$, $P_2$, one possible mapping is: $[D_1 \rightarrow P_1, D_2 \rightarrow P_2, D_3 \rightarrow P_2, D_4 \rightarrow P_1]$. It should be understood that four data tiles and two processing units are illustrative only and that there can be several, e.g., 10, 24, 32, 64, 75, 100, 2000, etc. data tiles and several processing units/notes (e.g., 2, 3, 4, 6, 10, 32, 50, 64, 128, 200, 500, etc.).

Contiguous data allocation with the help of a look-up table: While creating data structures however (using e.g., Global Arrays or NUMA alloc), data are allocated contiguously and a look-up table is created in some embodiments to index data correctly. The table itself may be distributed across processors (e.g., using Global Arrays). To allocate data in a contiguous fashion in the foregoing example, the data layout is changed to: $[D_1, D_4, D_2, D_3]$ and data-tiles $D_1$, $D_4$ are allocated to $P_1$; and $D_2$, $D_3$ are mapped to $P_2$. A look-up table can map the original indexes to modified ones and the look-up table may be used while performing reads and writes to data stored in the global arrays. The map (from the original data-tile indexes to new data-tile indexes) for the illustrative example is: $[1 \rightarrow 1, 2 \rightarrow 3, 3 \rightarrow 4, 4 \rightarrow 2]$.

The runtime support may include facilities for the creation of global arrays respecting the data-tile to processor assignment that the compiler specifies and re-indexing capabilities when data are to be fetched from and written to the global array. The application code, i.e., the code to be executed using the multi-node system can be agnostic to the data layout transformation that embodiments of this procedure may carry out.

Experimental Evaluation

We have implemented the auto-parallelization and communication minimizing algorithms in an embodiment of the R-Stream™ compiler. We herein describe experiments conducted to evaluate communication minimization achieved by the integrated compiler and runtime scheme presented.

Set Up

Table 1 lists the benchmark programs and problem sizes used for experiments. The corcol code computes a correlation matrix. The gemver benchmark does vector multiplication and matrix addition, while doitgen is a multi-resolution analysis kernel. The planck and hydro are from the Livermore loops. planck derives Planckian distribution and hydro is a 2-D explicit hydrodynamics fragment. The stencil—Reverse Time Migration (RTM) is used in a finite difference discretization of the wave equation when performing seismic imaging. The amf and covar are adaptive matched filtering and covariance estimation components of the space-time adaptive processing (STAP) application domain that is part of the PERFECT benchmark suite.

TABLE 1

Benchmarks

| Benchmark | Problem size | $\min \frac{\mathcal{R}}{\mathcal{W}}$ |
|---|---|---|
| corcol (c) | 3000 × 3000 | 2 |
| gemver (g) | 3000 × 3000 | 3 |
| doitgen (d) | 50 × 50 × 50 | 2 |
| planck (p) | 5000 | 2 |
| hydro (h) | 2000 × 2000 | 3 |
| RTM (r) | 264 × 264 × 264 | 2 |
| amf (a) | 4 × 512 × 32 | 2 |
| covar (v) | 4 × 512 × 32 | 4 |

It should be understood that these benchmarks are illustrative only, and that the techniques described herein are not dependent on any of these and/or other programs. Various embodiments described herein are not particularly constructed for executing any of these benchmark programs. Instead, various embodiments can minimize the cost of communication incurred while executing these benchmarks using a multi-node (multi processing unit) computing system, in part by duplicating one or more data structures of the program on one or more nodes.

The codes were cluster-parallelized using R-Stream™ and were compiled with PathScale™ Compiler Suite: Version 4.0.10 and —O3 flag. The resulting binaries were run on 8 nodes of a cluster. Each node is made up of AMD Opteron™ Processor model 6272 processors. One process was launched per node. For each benchmark, experimental data—number of local and remote memory accesses, running time were gathered for two program variants: 1) auto-parallelized codes 2) auto-parallelized and communication minimized programs (marked with a ':c' suffix in the ensuing graphs).

The communication optimization is achieved by selective data replication according to various embodiments described above. The inspectors inserted by the R-Stream™ compiler drive data replication decisions (§ IV). The inspection phase computes the read-to-write ratio to each array used in the application. In our experiments, we experimented with different threshold $$\frac{\mathcal{R}}{\mathcal{W}}$$

ratios and Table I reports the minimum read-to-write ratio that was required for each benchmark program to achieve maximum reduction in data movement. We note that the minimum $$\frac{\mathcal{R}}{\mathcal{W}}$$

value is typically small: 2 for a majority of benchmarks and at most 4. Therefore, the communication avoidance method is applicable to a wide range of applications.

Results

Figure 6:
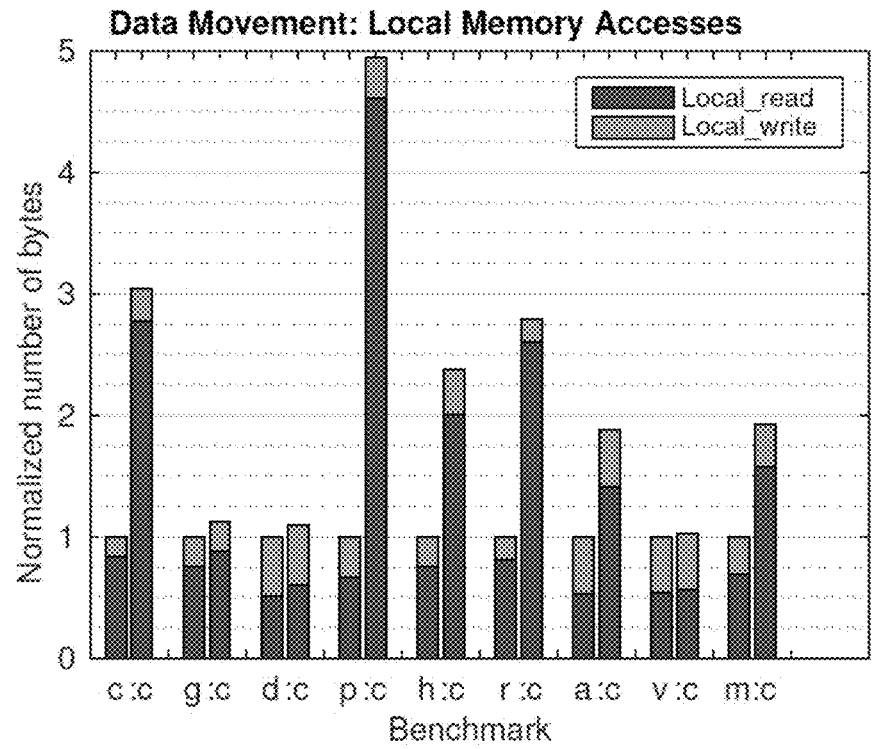
FIG. 6 shows a comparison between the respective numbers of local accesses without duplication and with duplication of data structures according to one embodiment, for several benchmarks.
Figure 7:
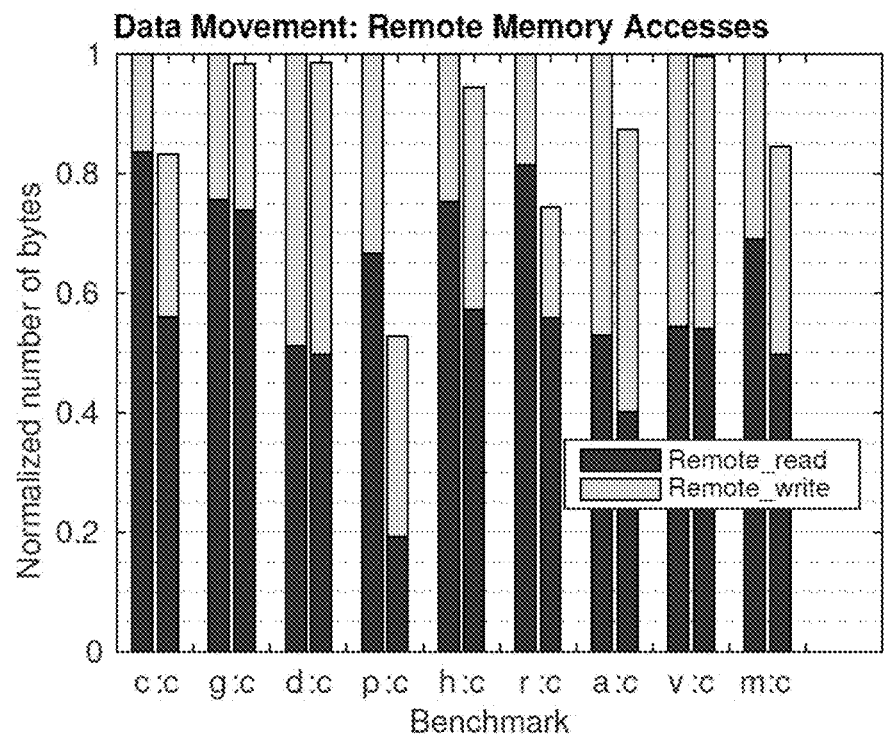
FIG. 7 shows a comparison between the respective numbers of remote accesses without duplication and with duplication of data structures according to one embodiment, for the benchmarks of FIG. 6.

FIGS. 6 and 7 show data movement statistics of a) parallel programs and b) parallel plus communication minimized programs. Data movement between nodes is triggered when a virtual DMA GET or a PUT accesses parts of the Global Array that are resident on other nodes. The number of bytes transferred for communication-minimized benchmarks are normalized with respect to that of parallelized but not communication optimized programs.

The maximum data movement reduction was achieved in planck code: the number of remote memory accesses were decreased by 47%. Out of five arrays in planck (p), three are read-only arrays and they were replicated. It is the main reason for significant reduction in remote memory accesses. The corcol (c) benchmark uses 8 global arrays, of which 4 were replicated: two are read-only arrays, while two others are both read- and write-arrays. It finds its remote memory accesses reduced by 17%. The geometric mean of reduction in the number of remote memory operations across benchmarks is 15.5% (the last two bars marked m and m:c. m stands for mean).

The number of local accesses for benchmarks are depicted in FIG. 6. The trends are opposite of remote accesses—as remote accesses are lowered, local accesses are proportionately enhanced. On average (geometric mean), the number of local accesses is 1.93× higher with communication minimized programs. We observe that the selective data replication approach converts energy-hungry remote memory accesses to inexpensive local accesses.

Figure 8:
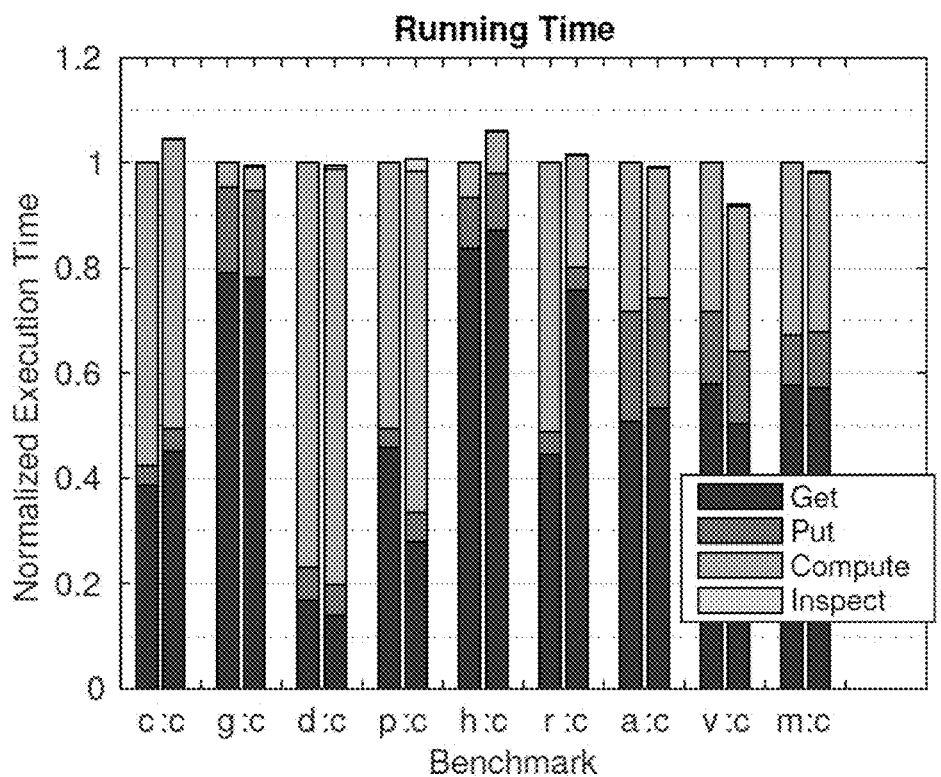
FIG. 8 shows a comparison between the respective execution performance without duplication and with duplication of data structures according to one embodiment, for the benchmarks of FIG. 6.

FIG. 8 shows the normalized running times of applications. The break-down of execution time is also depicted: times spent in performing virtual DMA GETs, DMA PUTs, computation and inspection are graphed. We observe that the inspection time is a very tiny fraction of the total execution time. In five out of eight benchmarks—gemver (g), hydro (h), and RTM (r), amf (a), and covar (v), a majority of time is expended in communicating—in DMA GETs and PUTs. The execution time of communication avoiding codes is 1.6% less than that of just parallel codes on average (geo-mean).

TABLE 2

Communication Energy Costs.

| Local memory | 4 pJ/byte |
|---|---|
| Remote memory | 60 pJ/byte |

Figure 9:
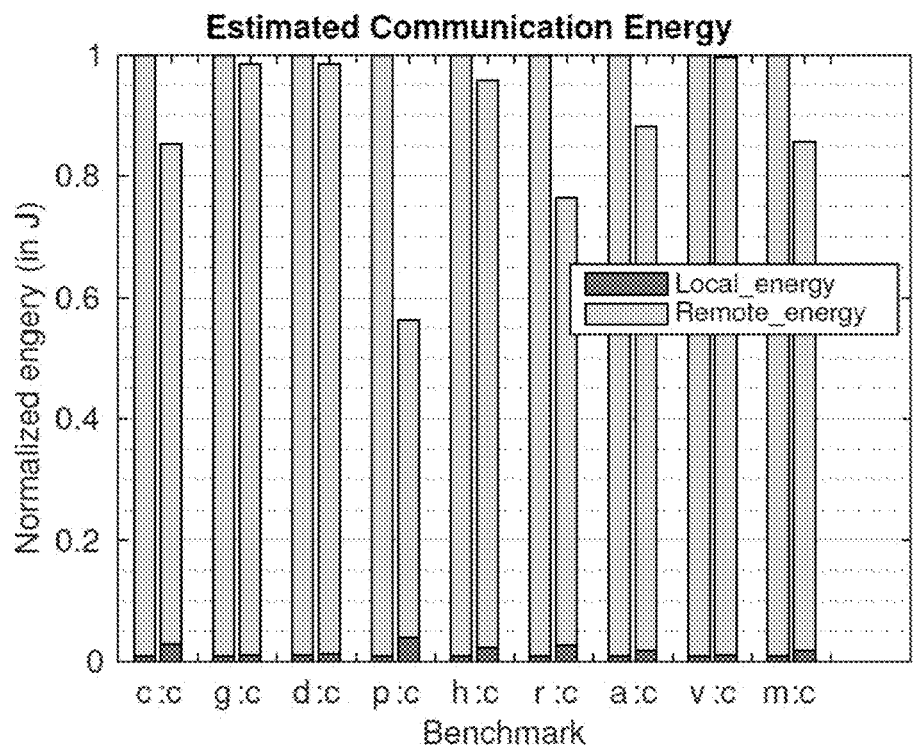
FIG. 9 shows a comparison between the respective expected communication energy consumed without duplication and with duplication of data structures according to one embodiment, for the benchmarks of FIG. 6.

The energy cost of communication relative to computation is orders of magnitude higher on current systems and the trend is expected worsen as technology scales. Table II shows the intra-node and inter-node memory access costs. The remote memory accesses are up to 15 times more expensive compared to local memory accesses on some hardware architectures. Using these representative communication costs, reduction in communication energy from the communication minimization techniques described herein can be estimated. FIG. 9 depicts the energy expended by communication-avoiding codes in accessing local and remote memories when compared to non-optimized codes. The communication energy reduction is 44% in planck (p) benchmark while it is 24% in RTM (r). The communication-avoiding techniques on average (geometric mean) reduce communication energy by 14%. We note that remote memory access energy dominates the total communication energy budget. Further, the proportion of energy spent in accessing remote memory is lower in communication-minimizing codes because remote memory accesses have been traded off for energy-efficient local memory accesses.

The vast parallelism available in today's systems requires that effective compiler technology be developed to parallelize programs. At the same time, energy has become a first-class design constraint in the design of computing systems and the data movement cost is projected to be orders of magnitude higher than that of computation cost. Consequently, reducing data movement can reduce energy expenditure and thus contribute substantially to easing the energy envelope.

In various embodiments, an integrated compiler and runtime are provided to auto-parallelization of codes for clusters and a communication optimization technique is provided that can avoid communication via selective data replication. The runtime can make optimal decisions on data replication with input from the compiler. The automatic data replication strategy for communication avoidance presented according to various embodiments generally tracks memory for communication, but is more general in three significant ways: 1) it is not algorithm-specific; 2) even write data may be replicated and data consistency is automatically maintained; 3) it does not depend on processor grid configurations, and is generally applicable to any configuration of processing units/nodes. Our experiments on a set of benchmarks indicate that various embodiments can reduce data movement between processors and associated energy costs significantly—up to 44% in some applications.

As discussed herein, allocation of data structures to a number of processing nodes cannot be considered to be a mathematical or mental concept. Such allocation that takes into consideration the respective sizes of data structures and the total memory capacity available across a number of processing units/nodes, as described above, is also not merely performing generic computer and/or database operations and is also not mere data organization or reorganization.

Unlike any generic operations such as data transmission and reception, unlike usual computer functions such as storage and access of information, and unlike any mathematical or mental processes such as comparing and categorizing information, the unconventional operations involved in allocation of one or more data structures, as described herein, are specifically orchestrated. Specifically, the allocation performed by various embodiments involves selecting one or more data structures for duplication thereof according to memory access patterns of those data structures and the amount of memory available for duplication, so as to minimize a data communication cost. These specific operations make the methods and systems for allocation of data structures limited and specialized techniques of improving the performance of a data processing system having more than one processing units.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for allocating data structures accesed by one or more tasks to be executed by a plurality of processing nodes, each processing node having a respective local memory, the method comprising performing by a processor steps of:
   (a1) selecting as a first data structure, a data structure having a read-write ratio greater than a read-write threshold, the read-write ratio corresponding to read-write operations in the one or more tasks to be executed in the distributed manner by the plurality of processing nodes;
   (b1) computing a first duplication factor for the first data structure; and
   (c1) generating a first statement allocating the first data structure duplicated by the first duplication factor, across the plurality of processing nodes.

2. The method of claim 1, wherein the first duplication factor is based on, at least in part, at least one of: (i) a number of the plurality of processing nodes, (ii) the read-write ratio of the first data structure, (iii) a first value of total available memory size of the plurality of processing nodes, and (iv) a size of the first data structure.

3. The method of claim 2, further comprising computing by the processor the first value of the total available memory size using a sum of memory capacity of each processing node in the plurality of processing nodes.

4. The method of claim 3, further comprising computing by the processor another value of the total available memory size based on, at least in part, the first value, the first duplication factor, and the size of the first data structure.

5. The method of claim 1, further comprising performing by the processor the steps of:
   (a2) selecting as a second data structure, another data structure having a read-write ratio greater than the read-write threshold;
   (b2) computing a second duplication factor for the second data structure, the second duplication factor being based on, at least in part, at least one of: (i) the number of the plurality of processing nodes, (ii) the read-write ratio of the second data structure, (iii) a second value of total available memory size of the plurality of processing nodes, and (iv) a size of the second data structure; and
   (c2) generating a second statement allocating the second data structure duplicated by the second duplication factor, across the plurality of processing nodes.

6. The method of claim 5, further comprising performing by the processor the steps of:
   prior to performing the steps (b1) and (b2), comparing the read-write ratio of the first data structure with the read-write ratio of the second data structure;
   if the read-write ratio of the first data structure is greater than the read-write ratio of the second data structure:
   performing the step (Ill) before the step (b2); and
   computing the second value of the total available memory size based on, at least in part, both the first duplication factor and the size of the first data structure; and
   otherwise:
   performing the step (b2) before the step (b1).

7. The method of claim 1, further comprising computing by the processor the read-write ratio of the first data structure.

8. The method of claim 1, further comprising computing by the processor the read-write threshold as a function of the number of processing nodes in the plurality of processing nodes.

9. The method of claim 1, further comprising computing by the processor:
   a correction factor representing an average local access to the first data structure by at least one processing node in the plurality of processing nodes; and
   the read-write threshold as a function of the number of processing nodes in the plurality of processing nodes and the correction factor.

10. The method of claim 1, further comprising performing by the processor the steps of:
    generating a local write statement for the first data structure, storing by a first processing node a data value in an instance of the first data structure in local memory of the first processing node; and
    for a set of processing nodes in the plurality of processing nodes, a cardinality of the set depending on the first duplication factor, generating a set of remote write statements for the first data structure, storing by the first processing node the data value in respective instances of the first data structure in respective local memories of the nodes in the set.

11. A method for allocating data structures accessed by one or more tasks to be executed by a plurality of processing nodes, each processing node having a respective local memory, the method comprising performing by a processor steps of:
(a) selecting a set of data structures, each data structure having a read-write ratio greater than a read-write threshold, each read-write ratio corresponding to read-write operations in the one or more tasks to be executed in a distributed manner by the plurality of processing nodes;
(b) designating a rank to each data structure according the read-write ratio thereof, and ordering the set of data structures according to the ranks; and
(c) iterating in the order of the ordered set, each iteration comprising:
computing for a data structure corresponding to the iteration a duplication factor; and
generating a statement allocating the data structure duplicated by the duplication factor, across the plurality of processing nodes.

12. The method of claim 11, wherein the duplication factor is based on, at least in part, a value of total available memory size of the plurality of processing nodes, the method further comprising, during a current iteration of the step (c) and prior to a next iteration:
updating by the processor, the value of the total available memory size based on, at least in part, the size of the data structure corresponding to the current iteration and the duplication factor associated with the data structure.

13. The method of claim 12, further comprising computing by the processor, during a first iteration of the step (c), the value of the total available memory size using a sum of memory capacity of each processing node in the plurality of processing nodes.

14. The method of claim 11, wherein in each iteration of the step (c), the duplication factor is based on, at least in part, at least one of: (i) a number of the plurality of processing nodes, (ii) the read-write ratio of the data structure corresponding to the iteration, (iii) a size of the data structure, and (iv) a value of total available memory size of the plurality of processing nodes.

15. A method for allocating data structures accessed by one or more tasks to be executed by a plurality of processing nodes, each processing node having a respective local memory, the method comprising performing by a processor steps of:
(a) selecting a set of data structures, each data structure having a read-write ratio greater than a read-write threshold, each read-write ratio corresponding to read-write operations in the one or more tasks to be executed in a distributed manner by the plurality of processing nodes;
(b) computing a respective value of a memory access parameter for each data structure; and
(c) determining a respective duplication factor for each data structure by optimizing a function of the respective duplication factors and the respective values of the memory access parameter, subject to a memory capacity constraint based on a number N of processing nodes, N being greater than one.

16. The method of claim 15, wherein:
the memory access parameter comprises a reduction in a number of remote accesses; and
optimizing the function comprises maximizing the function.

17. The method of claim 15, wherein:
the memory access parameter comprises a number of remote accesses; and
optimizing the function comprises minimizing the function.

18. The method of claim 15, wherein a first respective value of the memory access parameter corresponding to a first data structure comprises a first correction factor based on an association between the first data structure and a first processing node.

19. The method of claim 15, wherein the step of optimizing the function comprises solving a mixed integer linear programming representation of the function and the memory capacity constraint.

* * * * *

UNITED STATES PATENT AND TRADEMARK OFFICE
CERTIFICATE OF CORRECTION

| | | |
|---|---|---|
| PATENT NO. | : 10,496,304 B2 | Page 1 of 1 |
| APPLICATION NO. | : 14/987216 | |
| DATED | : December 3, 2019 | |
| INVENTOR(S) | : Muthu M. Baskaran et al. | |

It is certified that error appears in the above-identified patent and that said Letters Patent is hereby corrected as shown below:

In the Specification

At Column 1, Line 13, insert:
-- STATEMENT OF GOVERNMENT SUPPORT
This invention was made with government support under Contract No. HR0011-12-C-0123 awarded by the Defense Advanced Research Projects Agency (DARPA). The government has certain rights in the invention. --

Signed and Sealed this
Twenty-sixth Day of July, 2022

Katherine Kelly Vidal
*Director of the United States Patent and Trademark Office*